(12) United States Patent
Mazurek

(10) Patent No.: US 11,855,545 B1
(45) Date of Patent: Dec. 26, 2023

(54) SINGLE STAGE SYNCHRONOUS GENERALIZED REGULATOR

(71) Applicant: Lee Fredrik Mazurek, Groton, CT (US)

(72) Inventor: Lee Fredrik Mazurek, Groton, CT (US)

(73) Assignee: Lee Fredrik Mazurek, Groton, CT (US)

( * ) Notice: Subject to any disclaimer, the term of this patent is extended or adjusted under 35 U.S.C. 154(b) by 0 days.

(21) Appl. No.: 18/464,220

(22) Filed: Sep. 10, 2023

(51) Int. Cl.
*H02M 3/335* (2006.01)
*H02M 3/00* (2006.01)
*H02M 1/00* (2006.01)

(52) U.S. Cl.
CPC ......... *H02M 3/33584* (2013.01); *H02M 3/01* (2021.05); *H02M 3/33569* (2013.01); *H02M 3/33592* (2013.01); *H02M 1/0009* (2021.05)

(58) Field of Classification Search
CPC ......... H02M 3/33584; H02M 3/33569; H02M 3/33592; H02M 1/0009; H02M 1/0025; H02M 1/0054; H02M 1/0058
See application file for complete search history.

(56) References Cited

U.S. PATENT DOCUMENTS

| | | | | |
|---|---|---|---|---|
| 4,331,263 A * | 5/1982 | Brown | ............ | B65G 27/32 318/132 |
| 4,730,243 A * | 3/1988 | Glennon | ............ | H02M 3/28 363/44 |
| 5,654,880 A * | 8/1997 | Brkovic | ............ | H02M 1/4258 363/17 |
| 5,969,962 A * | 10/1999 | Gabor | ............ | H02M 1/4225 363/81 |
| 6,282,104 B1 * | 8/2001 | Kern | ............ | H02M 1/12 363/40 |
| 8,693,213 B2 * | 4/2014 | Jungreis | ............ | H02M 1/4241 363/17 |
| 9,257,913 B1 * | 2/2016 | McDonald | ............ | H02M 3/3376 |
| 9,287,795 B2 * | 3/2016 | Ma | ............ | H02M 3/3388 |
| 9,425,700 B2 * | 8/2016 | Lu | ............ | H02M 3/3376 |
| 10,541,598 B1 * | 1/2020 | Rozman | ............ | H02P 9/00 |
| 10,680,510 B2 * | 6/2020 | Elferich | ............ | H02M 3/01 |
| 10,917,017 B1 * | 2/2021 | McFarland | ............ | H02M 3/3376 |
| 11,757,375 B2 * | 9/2023 | Chen | ............ | H02M 1/0009 363/166 |

(Continued)

*Primary Examiner* — Yusef A Ahmed

(57) ABSTRACT

A voltage controlled bridge is coupled to a line voltage and a transformer primary harmonic voltage, and a current controlled bridge is coupled to a line current and a transformer secondary harmonic voltage. A synchronous average harmonic current compensator integrates error between a measure of bridge current and commanded current synchronously over each half of a switching period and samples compensator output to control line current and linearize harmonic coupling between isolated bridges. A synchronous pulse width modulation process tracks commanded line voltage. One or more of a primary harmonic command circuit and secondary harmonic command circuit adjust the harmonic coupling voltage of the voltage controlled and current controlled bridge respectively. Line voltage, line current, and primary and secondary harmonic commands provide generalized line and isolated voltage bus regulation degrees of freedom in a single stage.

18 Claims, 8 Drawing Sheets

(56) References Cited

U.S. PATENT DOCUMENTS

| | | | | |
|---|---|---|---|---|
| 2003/0035308 A1* | 2/2003 | Lynch | H02J 3/381 | 363/34 |
| 2003/0222633 A1* | 12/2003 | Hwang | H02M 1/36 | 323/282 |
| 2008/0290846 A1* | 11/2008 | Kanouda | H02M 1/4225 | 323/222 |
| 2009/0021964 A1* | 1/2009 | Hsu | H02J 3/1842 | 363/39 |
| 2010/0019697 A1* | 1/2010 | Korsunsky | H05B 45/3725 | 315/307 |
| 2011/0216558 A1* | 9/2011 | Uno | H02M 1/4225 | 363/126 |
| 2011/0222318 A1* | 9/2011 | Uno | H02M 3/33523 | 363/21.04 |
| 2012/0106206 A1* | 5/2012 | Tang | H02M 3/3376 | 363/21.02 |
| 2013/0099788 A1* | 4/2013 | Xu | H02M 3/3376 | 324/322 |
| 2015/0022163 A1* | 1/2015 | Han | H02M 1/4216 | 323/205 |
| 2015/0023068 A1* | 1/2015 | Uno | H02M 3/33515 | 363/21.13 |
| 2015/0078041 A1* | 3/2015 | Huang | H02M 1/4258 | 363/21.18 |
| 2015/0222193 A1* | 8/2015 | Zambetti | H02M 1/08 | 363/21.02 |
| 2015/0349649 A1* | 12/2015 | Zane | H02M 3/33507 | 363/21.03 |
| 2015/0365005 A1* | 12/2015 | Panov | H02M 3/33584 | 307/24 |
| 2015/0372598 A1* | 12/2015 | Akiyama | H02M 3/285 | 363/17 |
| 2016/0181925 A1* | 6/2016 | Chiang | H02M 3/33584 | 363/17 |
| 2017/0025943 A1* | 1/2017 | Eren | H02M 7/539 | |
| 2017/0279376 A1* | 9/2017 | Siri | H02M 7/5395 | |
| 2018/0054134 A1* | 2/2018 | Moon | H02M 1/08 | |
| 2019/0052178 A1* | 2/2019 | Ishikura | H02M 3/33571 | |
| 2019/0097544 A1* | 3/2019 | Albertini | H03L 7/0807 | |
| 2019/0199194 A1* | 6/2019 | Nikitin | H02M 7/53873 | |
| 2019/0252972 A1* | 8/2019 | Minaki | H02P 6/10 | |
| 2019/0288607 A1* | 9/2019 | Zong | H02M 3/33584 | |
| 2019/0312519 A1* | 10/2019 | Iida | H02M 7/5387 | |
| 2020/0099288 A1* | 3/2020 | Young | H02M 1/32 | |
| 2020/0379496 A1* | 12/2020 | Wang | H02M 1/4225 | |
| 2020/0412238 A1* | 12/2020 | Zhu | H02M 1/4241 | |
| 2021/0111629 A1* | 4/2021 | Gray | H02M 3/28 | |
| 2021/0305903 A1* | 9/2021 | Furukawa | H02M 1/0006 | |
| 2022/0029528 A1* | 1/2022 | Chan | H02M 1/4225 | |
| 2022/0166307 A1* | 5/2022 | Wrathall | H02M 1/4225 | |
| 2022/0247320 A1* | 8/2022 | Stracquadaini | H02M 3/33569 | |
| 2022/0393604 A1* | 12/2022 | Mazurek | H02M 1/0058 | |
| 2022/0393605 A1* | 12/2022 | Mazurek | H02M 1/0022 | |
| 2023/0095989 A1* | 3/2023 | Hashimoto | H02M 3/33573 | 363/17 |
| 2023/0246557 A1* | 8/2023 | Mazurek | H02M 3/33584 | 363/21.02 |

* cited by examiner

SINGLE STAGE SYNCHRONOUS GENERALIZED REGULATOR

CROSS-REFERENCE TO RELATED APPLICATIONS

This application references the following applications by the same inventor: U.S. non-provisional application Ser. Nos. 18/337,014 (filed Jun. 18, 2023), 18/336,984 (filed Jun. 17, 2023), 17/731,632 (filed Apr. 28, 2022), 17/727,774 (filed Apr. 24, 2022), 17/727,757 (filed Apr. 24, 2022).

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM

Not applicable

STATEMENT REGARDING PRIOR DISCLOSURES BY THE INVENTOR OR A JOINT INVENTOR

Not applicable

BACKGROUND OF THE INVENTION

The present disclosure generally relates to a bidirectional isolated buck boost power conversion system, and more specifically, to a line connected single stage isolated buck boost power converter with synchronous average harmonic current control and methods of controlling the same.

Single stage power conversion systems are used to convert between isolated voltages with minimal parts and high efficiency. Prior art single stage systems include the single stage ćuk converter, and the single stage semi-resonant power converter illustrated in FIG. 1. The illustrated semi-resonant architecture uses a current fed arrangement where a voltage source (V1) is filtered to provide average current through an inductor (L0) which is switched relative to a ground potential (using SW0). A load current (ILOAD) draws a DC current from an isolated voltage (V2), wherein the average DC current flows from a switching diode D1, and unsteady current is equilibrated between the switching diode and a capacitor (CS2). An unsteady current commutates the switching diodes (D1 and D2) to result in a pulse width modulated voltage impressed across a DC blocking capacitor and a secondary transformer winding (LT2). Coupled transformer windings (LT1 and LT2) result in a switching voltage across a resonant network (LR and CR) which harmonically filters the coupled current. Inductance associated with the resonant network may be explicit, or formed partially or fully by leakage inductance of the transformer. The design shown in FIG. 1 is parts efficient and may be implemented with low electromagnetic interference and efficient semi-resonant switching, with current limiting when operated at switching frequencies away from resonance and low impedance when aligned with the resonant network natural frequency. The parts efficiency for the prior art resonant converter can lead to poor power efficiency at high power levels with wide ranging duty cycles due in part to the passive diode commutation. Diode and active switch duty cycles are related which can result in low harmonic voltage across the resonant network, and a high harmonic current to preserve power output. The prior art design may be implemented with bidirectional switches to allow for arbitrary AC or DC bus voltages, and additional series stages to implement low ripple regulated outputs. It is desirable to improve single stage power converters to allow for arbitrary harmonic buck and boost voltages with improved current conduction losses, and include regulated line and DC voltage bus connections in a single stage.

BRIEF SUMMARY OF THE INVENTION

In one aspect, the objective of this invention is to implement an efficient single stage power converter with regulated voltage and current line connections, and independent harmonically regulated isolated DC voltage busses. This objective is accomplished in the present invention by using synchronous average harmonic current control of a power converter with commanded harmonic coupling signals. The embodiment of FIG. 2 illustrates a voltage controlled bridge (201) resonantly coupled (205) through a transformer (209) to a current controlled bridge (202) using a synchronous average harmonic current (SAHC) compensator (210). The SAHC compensator uses a measured current (206) across switching nodes (VC and VD) of the current controlled bridge (202) to generate a superimposed feedback signal to a SAHC controlled pulse width modulation (PWM) process (208). The superimposed feedback signal encodes a non-modulated duty cycle command to control a current through a line connection (VAC2) to track commanded current (ICMD), and a modulated phase command to control current coupled through a transformer winding (LT1). A voltage controlled pulse width modulation (PWM) process (207) controls on a voltage controlled bridge line voltage (VAC1) to proportionally track a commanded voltage (VCMD). The synchronous average harmonic current compensator couples harmonic current flow between a primary harmonic voltage (of the voltage controlled bridge) and a secondary harmonic voltage (of the current controlled bridge) to harmonically transmit power through an isolation transformer. The primary harmonic voltage is controlled by the voltage controlled PWM process (207) as a function of command voltage and a primary commanded harmonic signal (B1). The secondary harmonic voltage is controlled by the synchronous average harmonic current controlled PWM process (208) as a function of commanded current and a secondary commanded harmonic signal (B2). The primary and secondary commanded harmonic signals are respectively generated by a primary (211) and secondary (212) differential harmonic controller (DHC) which command respective pulse width modulation processes (207 and 208). The single stage embodiment illustrated in FIG. 2 may be magnetically integrated (as illustrated in FIG. 3) by incorporating line filter elements with transformer coils. A simplified embodiment of a single stage synchronous generalized regulator (SGR) is shown in FIG. 4 which illustrates several external interfaces of a power converter similar to that shown in FIG. 2. The illustrated power converter imparts a current (ICD) as a function of current command (ICMD), imparts a voltage (VAB) as a function of voltage command, and adjusts harmonic current flow between the second bus voltage (V2) and the first bus voltage (V1) using harmonic commands B1 and B2. A detailed embodiment of a synchronous generalized regulator is illustrated in FIG. 5 which shows combinations of duty cycle (d1, d2), phase (p2), and harmonic command (B1, B2) signals to regulate an isolated line voltage and line current and isolated bus voltages in a single stage. An embodiment illustrated in FIG. 6 describes a method to regulate estimated harmonic current flow between isolated voltage busses of a single stage synchronous generalized regulator using harmonic command signals. An embodiment shown in FIG. 7 illustrates a method to regulate an isolated output line (VAC1) wherein an isolated input line drops to zero volts (VAC2) by commanding the input line current to zero and regulating output relative to stored DC bus energy using a harmonic command signal. A further embodiment is shown in FIG. 8 which illustrates a method to soft-start and regulate current into an energy storage capacitance and regulate output line voltage and bus voltage in a single stage. Multiple additional embodiments are possible using the presently invented converter which provides regulation degrees of freedom to independently control on isolated voltage and current controlled line connections and isolated bus voltages in a single stage.

These and additional objects and advantages provided by the embodiments described herein will be more fully understood in view of the following detailed description, in conjunction with the drawings.

BRIEF DESCRIPTION OF THE SEVERAL VIEWS OF THE DRAWING(S)

DETAILED DESCRIPTION OF THE INVENTION

Figure 6:
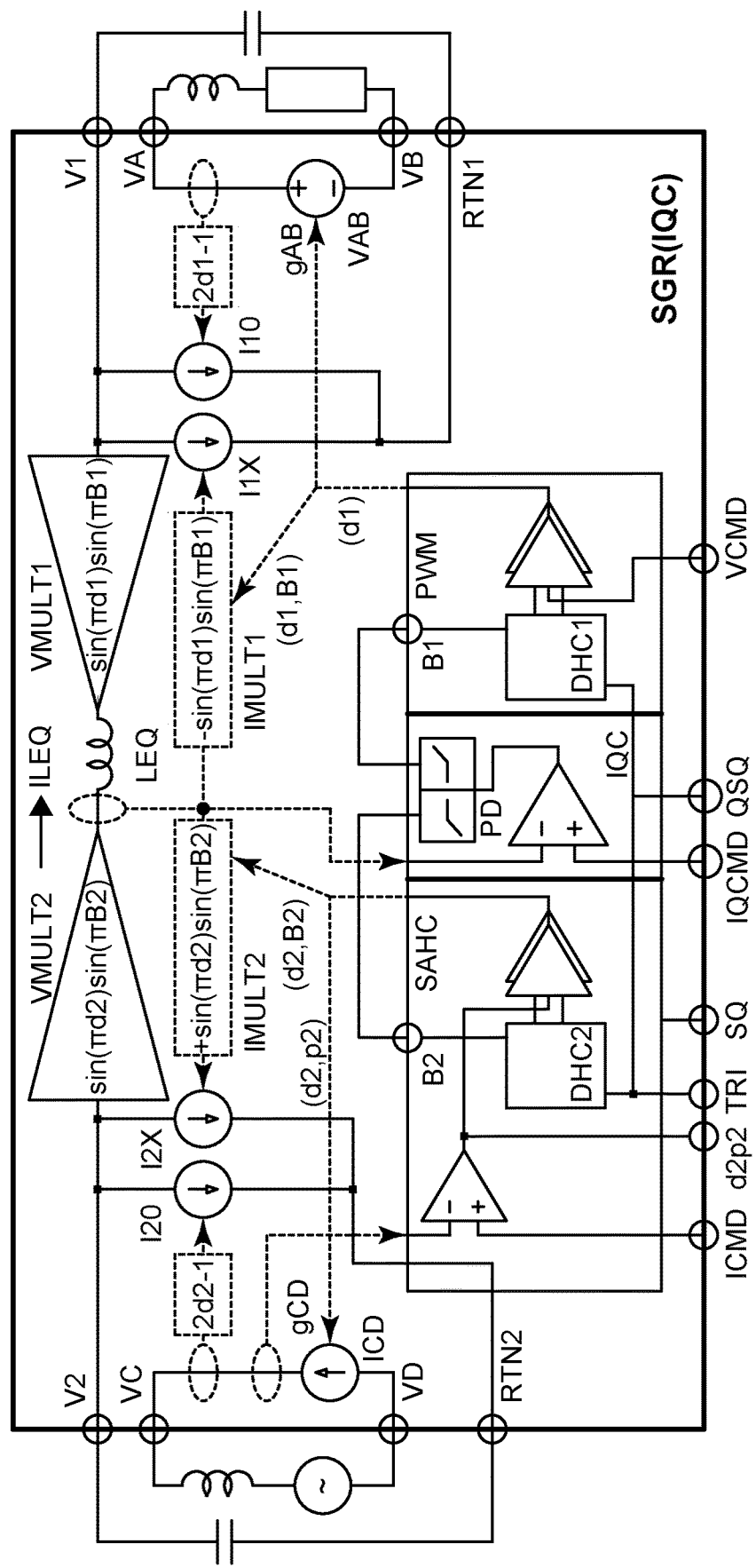
FIG. 6 illustrates detailed dynamics of a single stage synchronous generalized regulator with feedback regulated harmonic current transfer according to one or more embodiments shown and described herein.
Figure 7:
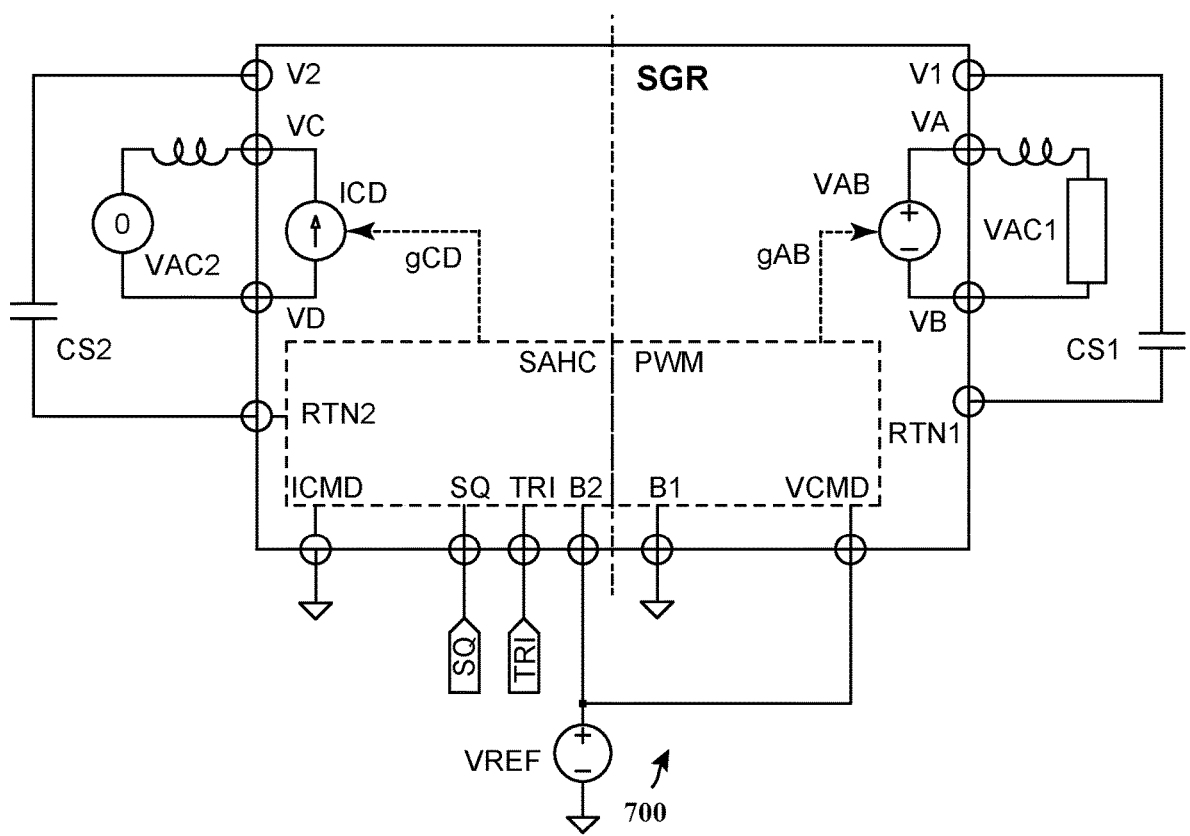
FIG. 7 illustrates a feedforward regulation circuit which regulates output voltage using stored energy according to one or more embodiments shown and described herein.
Figure 8:
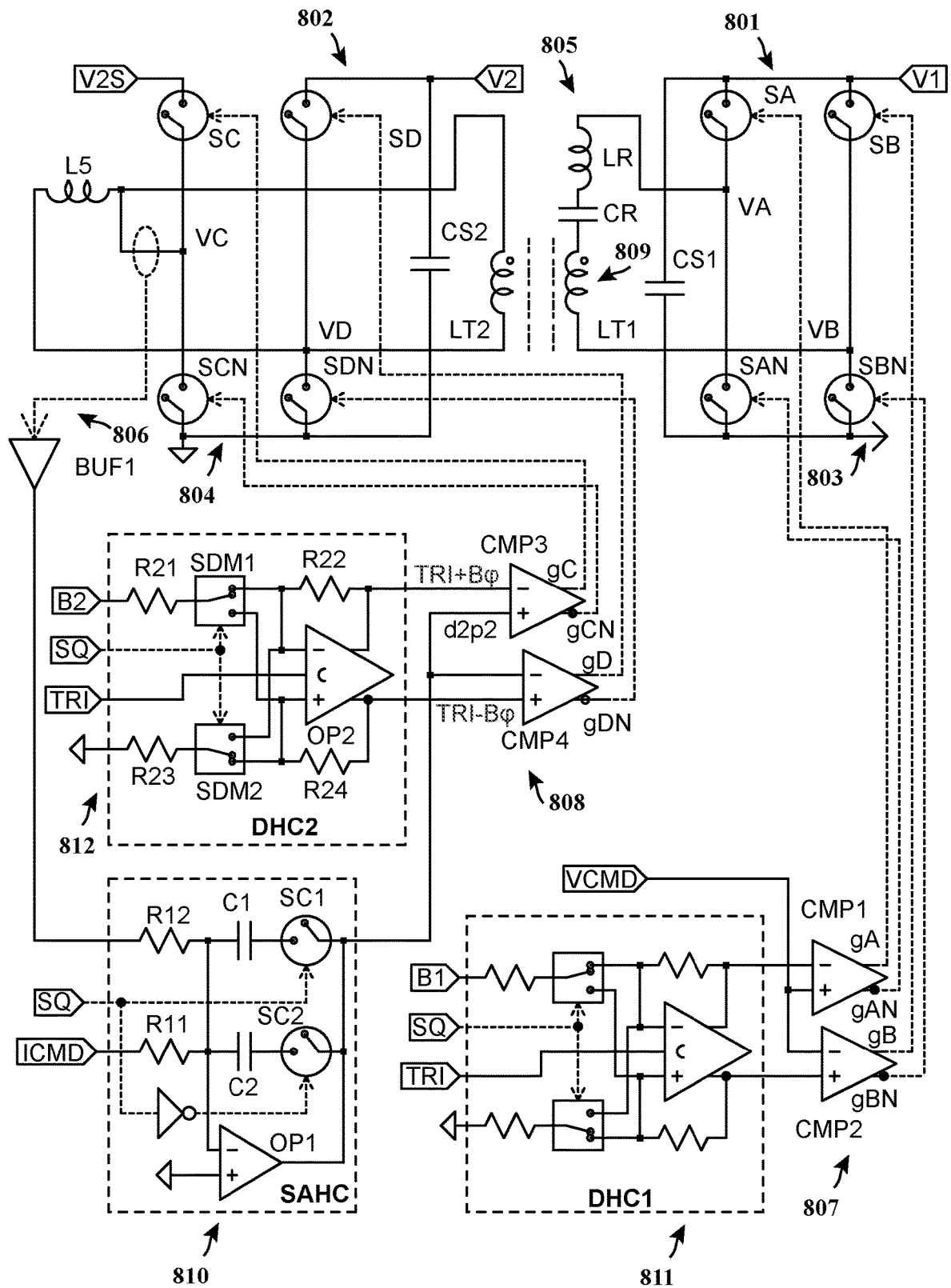
FIG. 8 illustrates an energy regulation circuit which is also coupled to an isolated voltage bus and line voltage according to one or more embodiments shown and described herein.

Embodiments described herein generally relate to a bidirectional single stage power converter with independently regulated isolated line and bus voltage connections and methods of forming using synchronous average harmonic current control and harmonic command signals. As shown and described herein, new embodiments of single stage synchronous generalized regulator (SGR) power systems are provided. The power converter superimposes multiple functions using synchronous average harmonic current control to regulate a current controlled bridge and couple a regulated voltage controlled bridge, with a primary and secondary harmonic command signal used to provide independent regulation degrees of freedom. The single stage power system allows for regulation of an isolated line current and an isolated line voltage with independent control of their respective DC bus voltages. A first embodiment of a single stage synchronous generalized regulator is illustrated and described using a detailed schematic (FIG. 2), which is illustrated at interfaces (FIG. 4) and with detailed internal dynamics (FIG. 5). The detailed internal dynamics are discussed further with mathematical equations which provide control relationships and expand on characterization of one or more embodiments. FIG. 3 illustrates an embodiment which efficiently integrates transformer and line filter magnetics. FIG. 6 shows an example to regulate harmonic current transfer between isolated voltage buses using feedback. FIG. 7 illustrates an example embodiment of an SGR converter used in a system which provides power relative to internal energy storage as an option for cases where line voltage drops. FIG. 8 illustrates an embodiment where a current controlled bridge is used to control energy exchanged with a storage capacitance and also to couple to isolated line and bus voltages. The techniques and methods described in one or more embodiments may be used as building blocks in multiple types of power systems due to their parts and power efficiency and flexibility in terms of regulated line and bus voltage connections. Bus voltage connections may include energy storage elements such as capacitors or batteries, allowing for stored energy and line power transfer.

Figure 1:
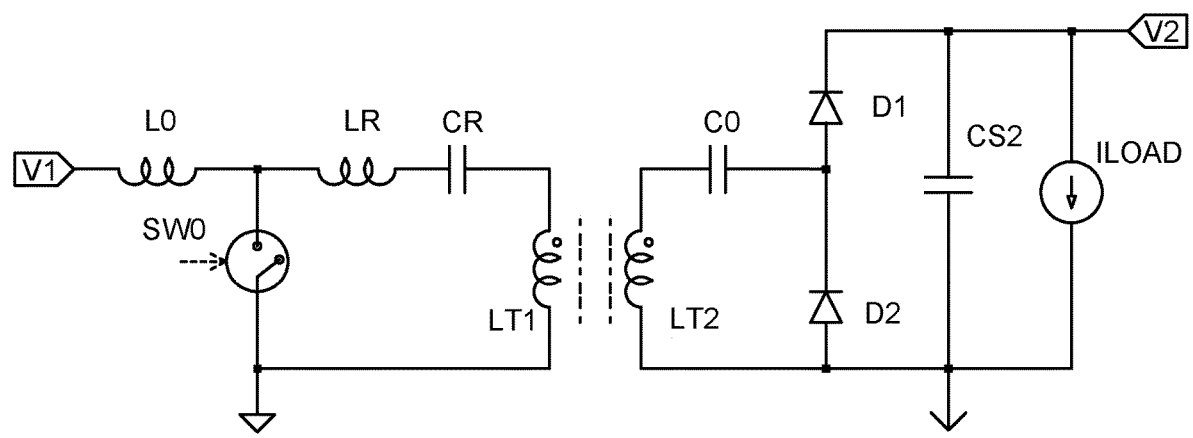
FIG. 1 illustrates a prior art single stage semi-resonant power converter.
Figure 2:
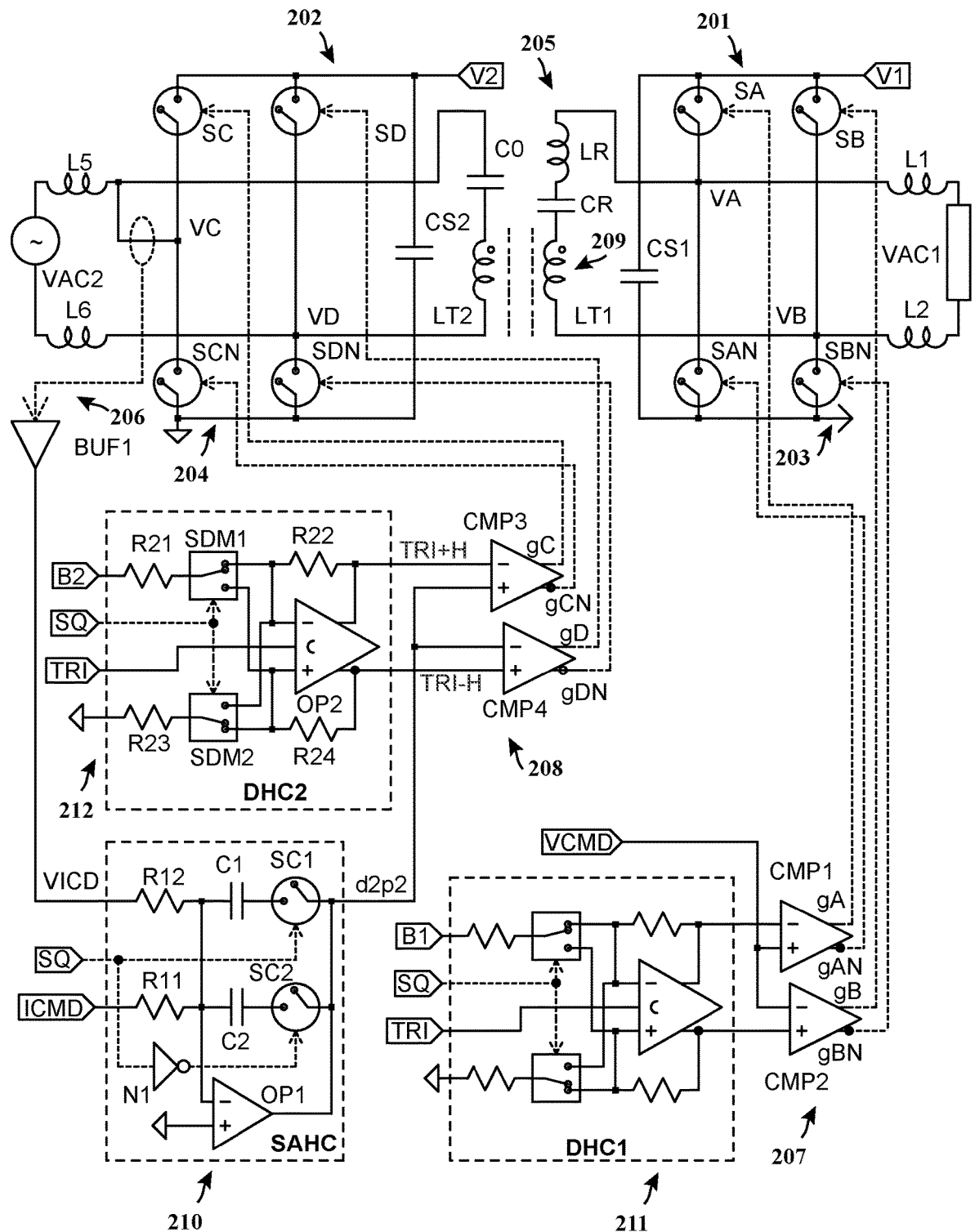
FIG. 2 illustrates a single stage synchronous generalized regulator according to one or more embodiments shown and described herein.
Figure 3:
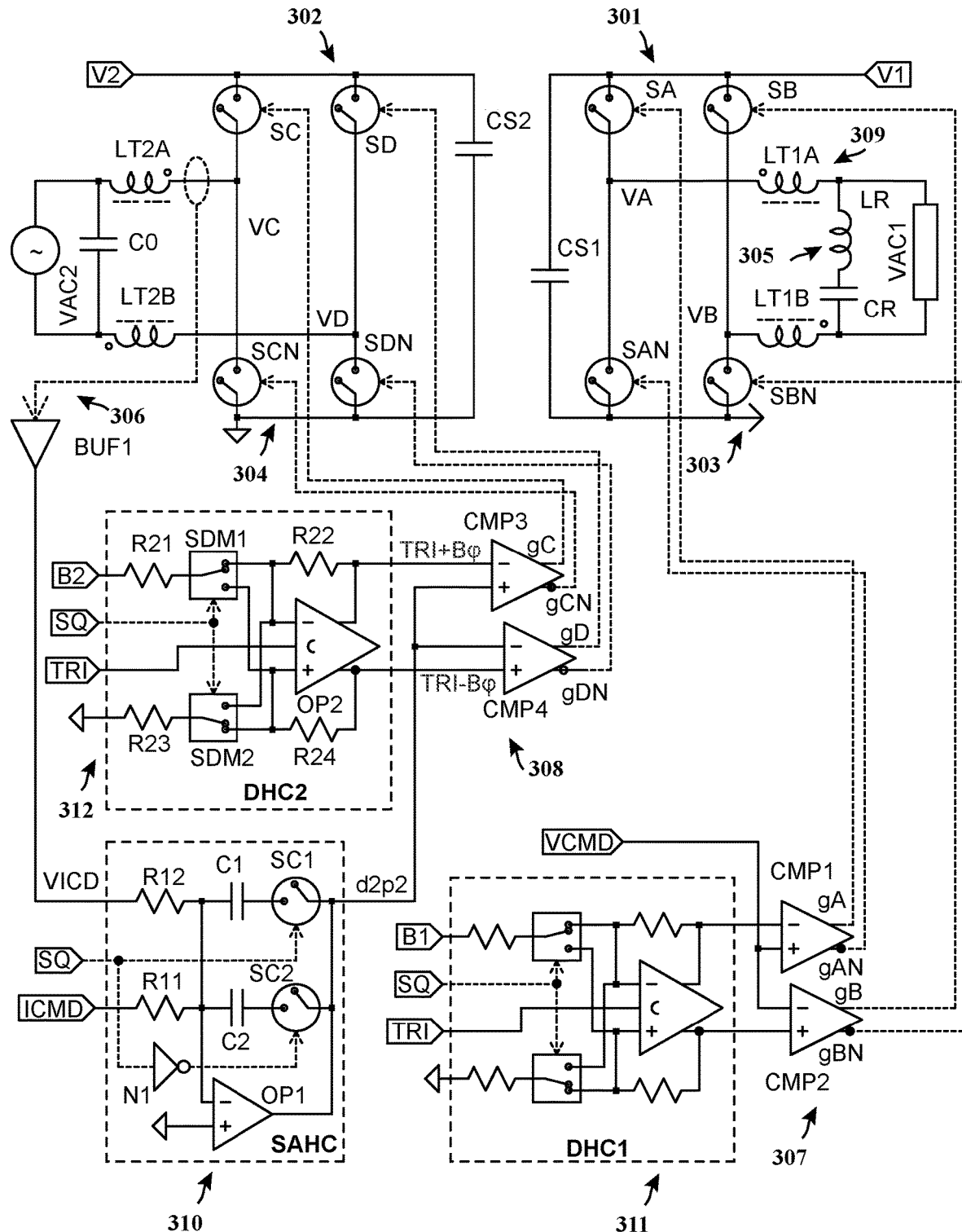
FIG. 3 illustrates a single stage synchronous generalized regulator with integrated magnetics according to one or more embodiments shown and described herein.

An embodiment of a single stage synchronous generalized regulator is illustrated in FIG. 2. The synchronous generalized regulator is further comprised of a current controlled bridge (202) which drives a line current (through VAC2), and a voltage controlled bridge which drives a line voltage (across VAC1). Respective bridges are coupled by a transformer (209) through an admittance network (205). The transformer provides isolation between a first voltage bus, V1 relative to a first reference (203), and a second voltage bus, V2 relative to a second reference (204). An isolated current sensor (206) senses bridge current, flowing from node VC to VD, representing a sum of low frequency line current and high frequency transformer current. A voltage proportional to bridge current (VICD) feeds back to a synchronous average harmonic current (SAHC) compensator (210). The SAHC compensator weights and sums the bridge current signal with a commanded current (ICMD) to form an error current signal, and synchronously compensates and integrates the error current signal over each half of a synchronous square wave (SQ) switching period. The commanded current may contain line and transformer current information. The SAHC compensator has linear time periodic dynamics which are used to efficiently represent two independent feedback degrees of freedom using one hardware pathway. Sampled output of the SAHC compensator encodes a duty cycle command and a phase command respectively using a superimposed non-modulated and modulated feedback signal (d2p2). An SAHC compensated pulse width modulation (PWM) process (208) generates fully differential pulse width modulated gate signals (gC, gCN, gD, and gDN). A differential harmonic controller (DHC2) uses a commanded harmonic input (B2) to superimpose a differential harmonic command onto a common modulation waveform (TRI) using a synchronous square wave (SQ) to modulate the harmonic command. The SAHC compensated PWM process is sensitive to the superimposed feedback signal, and the differential harmonic command waveform (TRI+H, and TRI−H). The set of signals to the PWM process given by the superimposed feedback signal and the differential harmonic command result in differential gate outputs with commanded common and difference duty cycles and commanded common and difference phases (related to harmonic content). A mathematical description of differential gate signal control of harmonic signal content is further discussed with FIG. 5. The SAHC compensator linearizes the coupling admittance between the current controlled bridge secondary harmonic voltage and the voltage controlled bridge primary harmonic voltage, resulting in linearized harmonic current flow between the bridges. The voltage controlled bridge is controlled to produce a line voltage (across VAC1) proportional to a commanded voltage (VCMD) using a voltage controlled pulse width modulation process (207). A primary differential harmonic command is generated by a primary differential harmonic controller (DHC1) with a common modulation waveform (TRI) to control the primary harmonic voltage. The command degrees of freedom of the system, including current command (ICMD), voltage command (VCMD), primary harmonic command (B1), and secondary harmonic command (B2) support independent regulation of isolated lines and voltage busses in a single stage. The low parts count single stage architecture presents the opportunity for good efficiency and parts count based reliability.

The current controlled bridge illustrated in FIG. 2 is further comprised of complementary sets of switching elements, (SC and SCN) and (SD and SDN). The complementary sets of switches are driven with respective complementary drive signals, (gC and gCN) and (gD and gDN), according to the state of the art wherein appropriate dead time is used to reduce cross conduction. The switching elements are implemented according to the state of the art based on application specific engineering criteria such as switching and conduction losses, where examples include SICFETs, GANFETs, MOSFETs and IGBTs and their appropriate gate drivers. The switching elements may be implemented with switches that contain integral or explicit diodes. The current controlled bridge switches a second bus voltage (V2) relative to a second voltage potential (204) in parallel with an energy storage capacitance (CS2). Switched nodes, VC and VD, are inductively coupled (using L5 and L6) to a line current (through VAC2), and are coupled to a transformer coil (LT2) through a capacitor (C0). The current controlled bridge transformer coil (LT1) is coupled to the voltage controlled bridge transformer coil (LT1) of a transformer (209). A current sensor (206) senses a current signal proportional to the current across bridge nodes (VC and VD), which includes line current and transformer current in the illustrated embodiment. Alternately, the current sensor may sense only transformer current to leave line current free. A buffer (BUF1) isolates the current signal (VICD) to drive the synchronous average harmonic current compensator. The isolated current sensor is implemented according to the state of the art, with bandwidth higher than the bridge switching frequency. A resistive shunt may be used for wide bandwidth current sensing, with signal elements located in the switching reference frame or with a suitable amplifier to reject common mode voltage relative to a non-switching reference frame (such as a long tailed pair or an IC isolation amplifier). Another method of current sensing is to implement an air gapped transformer with derivative (frequency proportional) current sensitivity, which may be summed with a proportional current signal and filtered to form a wide bandwidth current sensor. Additional examples known to the art include hall sensors and current sense transformers.

The synchronous average harmonic current (SAHC) compensator (210) is implemented in the embodiment shown in FIG. 2 using an inverting switched capacitor filter which compensates and samples an error current signal to generate a superimposed feedback signal (d2p2). The switched capacitor filter is further comprised of resistors, R12 and R11, which respectively sum the current signal (VICD) with commanded current (ICMD) to form an error current into the inverting node of an opamp (OP1). Switched capacitors, C1 and C2, are alternately switched (using SC1 and SC2) across the opamp output and inverting node and sampled synchronously with a square wave (SQ) and its complement (using N1) to integrate and compensate the error current. The sampled switched capacitors encode a superimposed feedback signal (d2p2), wherein a duty cycle command is represented as a superimposed non-modulated signal and a phase command is represented as a superimposed modulated signal. The opamp used for the switched capacitor filter is selected relative to switching bandwidth and signal slew rate. The analog switches, SC1 and SC2, may be implemented according to the state of the art, for example with integrated circuit analog switches such as CMOS or JFET circuits.

Alternate methods may be used in variational embodiments for implementing synchronous average harmonic current compensation and superposition of feedback signals. An analog multiplying phase detector may be implemented as an alternate method for compensating synchronous average harmonic current error over each half switching period, where a current signal drives a synchronous average multiplication process and an integrating error amplifier. The error current signal feedback is modulated by a multiplication process and averaged by the error amplifier to drive a voltage-controlled oscillator (VCO). This alternate method is less preferable because the VCO introduces an integrator which may be make stable compensation more difficult, and the VCO method synchronizes relative to the resonance of the admittance network rather than a synchronous clocking signal. The alternative analog multiplier and VCO method of synchronous average harmonic current compensation also requires additional components to superimpose feedback of multiple (for example line) current control signals using multiple independent hardware paths. Other alternate methods such as logical zero crossing detection based phase locked loops are not discussed here because they do not generally reduce synchronous average current. An additional alternate method is possible for encoding a phase and duty cycle command onto a feedback signal superimposed onto one hardware path in a modulated and non-modulated reference frame. A sawtooth signal may be used to compare against a non-modulated command to result in modified edge phase shift, and a modulated command to result in modified edge duty cycle. The alternate sawtooth method of encoding superimposed phase and duty cycle commands is less suitable for resonant power converters because the dynamic range of the duty cycle command may be relatively larger than the dynamic range of the phase command. The embodiment (210) illustrated in FIG. 2 for the SAHC compensator is preferable for encoding superimposed non-modulated and modulated feedback for resonant applications where the phase shift associated with current transfer is small resulting in the superimposed modulated signal being small.

An embodiment (212) of a differential harmonic controller (DHC) is illustrated in FIG. 2. The illustrated differential harmonic controller is further comprised of a fully differential opamp (OP2) with output resistors, R22 and R24, and input resistors, R21 and R23, switched using complementary analog switches, SDM1 and SDM2. The input to the DHC includes a commanded harmonic (B2) relative to a reference, a square wave (SQ) which is used to multiply the commanded harmonic to encode it onto a modulated differential output signal. The differential harmonic command waveform, (TRI+H, and TRI−H), includes a triangle wave superimposed as a common signal and a superimposed modulated differential harmonic command. The fully differential opamp (OP2) which generates the command may be implemented according to the state of the art, for example using a differential driver circuit with sufficient bandwidth to represent a modulated waveform. Further mathematical discussion of FIG. 5 describes how the differential harmonic command drives a pulse width modulation process to alter harmonic voltage coupling. The embodiment (212) illustrated in FIG. 2 applies a differential phase input to command a harmonic variation to the pulse width modulation process, and alternate methods are available to drive a differential harmonic command to change harmonic coupling. An alternative method, such as driving a duty cycle (which fixes or omits switches SMD1 and SDM2) may be used to alter differential harmonic content due to a (complementary) differential pulse width modulation process.

The SAHC compensated pulse width modulation (PWM) process (208) embodiment illustrated in FIG. 2 is further comprised of comparators, CMP3 and CMP4. The comparators take the differential harmonic command, TRI+H and TRI−H, and the superimposed feedback command, d2p2, as input to generate gate differential signals, (gC and gCN) and (gD and gDN). The differential harmonic command encodes modulated positive and negative differential phase shift command signals onto a common triangle modulation waveform to alter harmonic coupling. The superimposed feedback command encodes a non-modulated duty cycle feedback signal, and a modulated phase feedback signal. The inputs to respective comparators are complemented so that the superimposed feedback commands differential duty cycle and common phase shift, and the differential harmonic command input results in a differential phase shift and common triangle waveform. Alternate embodiments are possible to configure a differential pulse width modulation process, for example by complementing (or exchanging) inputs and inverting command signals the command encoding can be exchanged between differential and common command signals with equivalent results. The superimposed non-modulated and modulated feedback, and commanded harmonic input paths to the pulse width modulation process result in control on line current to relative to commanded current (ICMD), and harmonic coupling between the current controlled bridge and voltage controlled bridge.

An embodiment of a voltage controlled bridge is illustrated in FIG. 2. The voltage controlled bridge is commanded by the voltage controlled pulse width modulation process (207) to control line voltage (VAC1) as a function of commanded voltage (VCMD) duty cycle and bus voltage (V1) relative to an isolated voltage reference (203). The voltage controlled bridge is further comprised of complementary sets of switching elements, (SA and SAN) and (SB and SBN), which are controlled by respective gate signals, (gA and gAN) and (gB and gBN). The switches are implemented according to the state of the art along with appropriate gate drive circuitry to reduce switching losses, conduction losses, and cross conduction. The switches may include integral or explicit diodes which limit reverse voltage bias. The switching nodes of the voltage controlled bridge, VA and VB, are inductively coupled (using L1 and L2) to the line voltage (VAC1), and coupled through an admittance network (LR and CR) to the transformer primary coil (LT1). The admittance network may include reactive elements reflected to either of the transformer coils with similar results. An energy storage capacitor (CS1) is located across the voltage bus to locally recirculate high frequency switching currents. The voltage controlled pulse width modulation process is further comprised of comparators, CMP1 and CMP2, and is sensitive to a voltage command and a differential harmonic command. The differential harmonic command to the voltage controlled PWM process is generated by a primary differential harmonic controller (DHC1), wherein the elements of DHC1 have a similar description to DHC2. The primary differential harmonic controller generates a differential harmonic command proportional to the harmonic command input (B1), and a triangle waveform is superimposed as a common mode signal. Alternate pulse width modulation processes which generate similar outputs are possible, such as described in the mathematical discussion associated with FIG. 5. Additional methods also include digitally controlled pulse width modulation, however analog control methods have superior phase phase resolution relative to the switching period for resonant power converters.

A simplified embodiment relative to the embodiment illustrated in FIG. 2 may be developed by omitting one or more of the primary or secondary differential harmonic controllers. The simplified embodiment benefits from parts complexity reduction, and causes the harmonically coupled voltage to depend on a line command. A similar simplified embodiment may be developed wherein the line command is set to zero, and line conditions are set according to the harmonic coupling command. The benefit of the full embodiment illustrated in FIG. 2 is that the harmonic voltage coupling may be altered relative to the harmonic conditions controlled by the line command.

An embodiment of a synchronous generalized regulator with integrated magnetics is illustrated in FIG. 3. The independent magnetic elements connected to the voltage controlled bridge (201) and to the current controlled bridge (202) of FIG. 2 are respectively superimposed onto integrated magnetics. The inductive line filter (L5 and L6) and transformer secondary (LT2) of the current controlled bridge illustrated in FIG. 2 are integrated in FIG. 3 into a differential line filter and coupled transformer element (LT2A and LT2B). The inductive line filter (L1 and L2) and transformer secondary (LT1) of the voltage controlled bridge illustrated in FIG. 2 are integrated in FIG. 3 into a differential line filter and coupled transformer element (LT1A and LT1B). The inductive and capacitive elements respectively associated with the transformer primary and secondary of FIG. 2 are similar superimposed onto shared filter and transformer networks in FIG. 3 (305, LR and CR, and C0respectively). The integrated magnetics are approximately flux balanced for both AC and DC flux terms when the isolated line connection currents are approximately balanced. The remaining blocks (303, 304, 305, 306, 307, 308, 309, 310, 311, 312) of FIG. 3 are descriptively similar to those (203, 204, 205, 206, 207, 208, 209, 210, 211, 212) described in FIG. 2. Additional common mode filtering may be connected to line connections of the synchronous generalized regulator, where the common mode filtering has the benefit of small component size due to approximately balanced magnetic flux.

Figure 4:
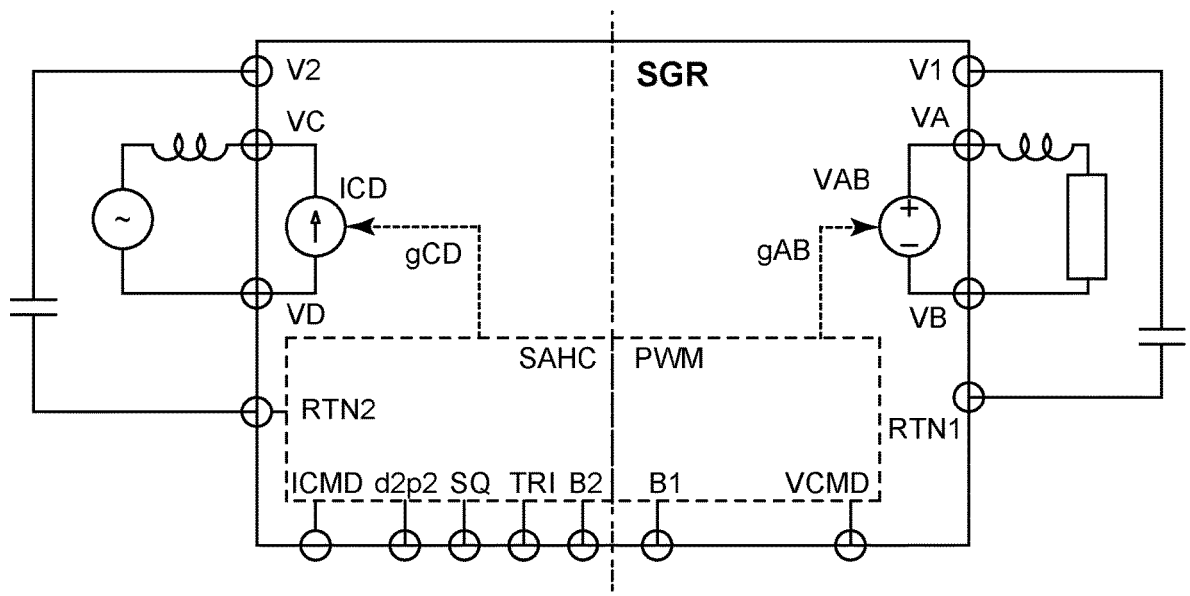
FIG. 4 illustrates simplified interfaces of a single stage synchronous generalized regulator according to one or more embodiments shown and described herein.
Figure 5:
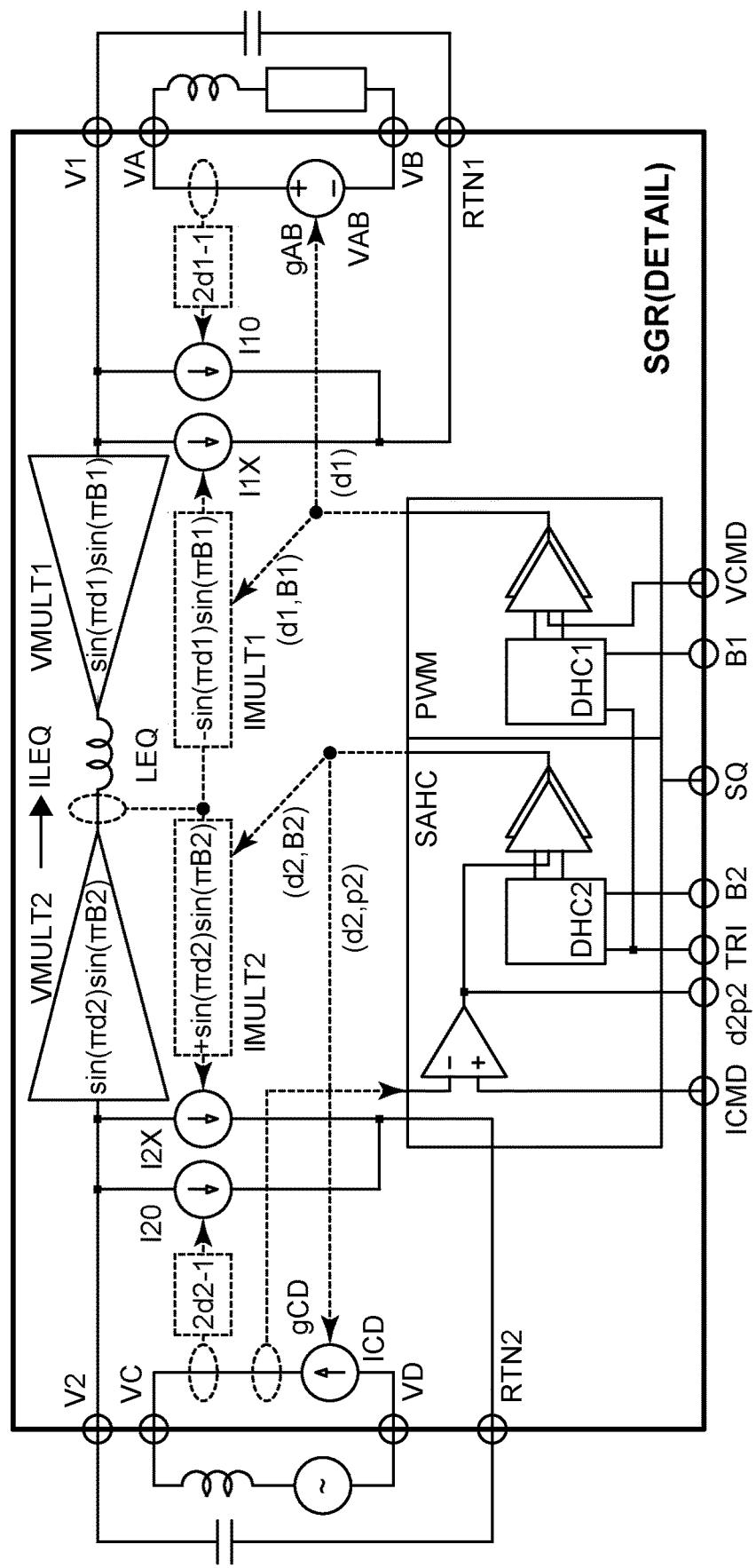
FIG. 5 illustrates detailed dynamics of a single stage synchronous generalized regulator according to one or more embodiments shown and described herein.

A simplified embodiment of a synchronous generalized regulator is illustrated in FIG. 4, with internal dynamics represented in a detailed dynamic embodiment illustrated in FIG. 5. The SGR block shown in FIG. 4 includes current controlled bridge power interfaces along the left edge, voltage controlled bridge power interfaces along the right edge, and signal interfaces along the bottom edge. The current controlled bridge interfaces include a bus voltage, V2 relative to return references RTN2, and a current ICD through switching nodes VC and VD of the bridge. The current is controlled to track commanded current (ICMD) by differential gate signals (gCD) generated by a synchronous average harmonic current (SAHC) controller with a differential harmonic command input (B2). Signals, SQ and TRI, represent a synchronous square wave and triangle waveform used to clock the power converter, and d2p2 represents a superimposed duty cycle and phase command output. The voltage controlled bridge interfaces include a bus voltage, V1 relative to return reference RTN1, and a voltage VAB across switching nodes VA and VB of the bridge. The voltage is controlled to track commanded voltage (VCMD) by differential gate signals (gAB) generated by a voltage controlled pulse width modulation controller with a differential harmonic command input (B1). The voltage controlled PWM stage is synchronous with the current controlled PWM stage. The interfaces represented by the SGR block (FIG. 4) may be used to realize flexible power systems, where the voltage and current interfaces are connected to external systems and associated bus voltages are regulated relative to one another based on harmonic (buck-boost) commands. The illustrated external interfaces have modest bandwidth requirements (relative to the internal feedback dynamics and switching frequency) which allow for straightforward integration into broader analog or digitally controlled power systems with readily available parts.

An embodiment of detailed dynamics of a synchronous generalized regulator is illustrated in the SGR(DETAIL) block of FIG. 5. Current controlled bridge power interfaces are illustrated along the left edge of the block, including bus voltage V2 relative to return RTN2, and bridge current ICD through switching bridge nodes VC and VD. The current controlled bridge is controlled by differential gate signal gCD generated by the synchronous average harmonic current (SAHC) controlled pulse width modulation (PWM) process. Signal level interfaces to the SAHC PWM process include: current command (ICMD), resulting superimposed duty cycle and phase signal (d2p2), triangle and square waveforms (TRI and SQ), and commanded secondary harmonic (B2). The current controlled bridge drives current (ICD) as a function of current command (ICMD), which is approximately related by power to linear bus current (I20) proportional to the duty cycle (2d2-1). The secondary harmonic command is superimposed onto the modulation process signals using a differential harmonic controller (DHC2) which affects secondary harmonic voltage. Voltage controlled bridge power interfaces are illustrated along the right edge of SGR(DETAIL), including bus voltage V1 relative to return RTN1, and bridge voltage VAB across switching bridge nodes VA and VB. The voltage controlled bridge is controlled by differential gate signals gAB generated by the voltage controlled pulse width modulation process. Signal level interfaces to the voltage controlled PWM process include: voltage command (VCMD), and primary harmonic voltage command to a differential harmonic control process (DHC1). The current flow through the voltage controlled bridge is approximately related by power to linear bus current (I10) by the duty cycle (2d1-1). Synchronous average harmonic current control attenuates reactive harmonic current (synchronous with the square wave), resulting in linearized harmonic coupling through an equivalent harmonic admittance (LEQ) between bridges. The linearized coupling between harmonic voltages of each bridge is given by the proportional constants of VMULT2 and VMULT1 which result in harmonic current flow (ILEQ) through LEQ. The transferred harmonic current may be estimated by multiplying a bridge current proportional signal (ie. VICD, FIG. 2) by a quadrature square wave which is 90 degrees lagging relative to the synchronous square wave used by the SAHC controller. Harmonic power is approximately preserved by equilibrating current flow through each respective bus, I2X and I1X, by proportional constants given by IMULT2 and IMULT1. Sufficient degrees of freedom are available to control a line current, line voltage, and relative harmonic power flow between the busses independently. The harmonic coupling coefficient for the current controlled bridge is a function of duty cycle (d2) and secondary harmonic command (B2), and the harmonic coupling coefficient for the voltage controlled bridge is a function of duty cycle (d1) and primary harmonic command (B1). Given that d1 and d2 are functions of commanded voltage and current respectively, the primary and secondary harmonic commands, B1 and B2, are free degrees of freedom to regulate harmonic coupling voltage and resulting harmonic power transfer between isolated bridges. The resulting dynamic model approximates a harmonic equivalent of a buck boost stage for purposes of isolated DC to DC power transfer.

Embodiments of a synchronous generalized regulator may independently command line and harmonic coupling, as mathematically described for a representative example by expanding on the DC and switching harmonic content of pulse width modulation processes. Logical gate signals, $g_A$ and $g_B$, are generated for an embodiment as:

$$g_A = PWM(d_1, \{TRI + \varphi\}) \qquad \text{EQ1A}$$

$$g_B = CPWM(d_1, \{TRI - \varphi\}) \qquad \text{EQ1B}$$

where PWM indicates a pulse width modulation process, and CPWM indicates a complementary pulse width modulation process where the inputs (or outputs) of the process are transposed. The subscript of $g_A$ and $g_B$, indicates a respective switched voltage node, VA and VB, associated with switches SA and SB (as illustrated in FIG. 2). Respective pulse width modulation processes have a first argument given by a duty cycle command, $d_1$ (as illustrated as VCMD in FIG. 2), and a second differentially applied argument, $\{TRI+\varphi\}$ and $\{TRI-\varphi\}$, generated by a differential harmonic controller. The differentially applied argument represents the superposition of a common triangle waveform and a differential phase command (used in one or more embodiments to control a differential harmonic). Steady state superimposed DC and switching harmonic content for the gate signals are given as:

$$g_A = (d_1) \cdot 1 + \left(\frac{\sin(\pi d_1)}{\pi}\right) \cdot \cos(2\pi \cdot (\theta(t) - \varphi)) \qquad \text{EQ2A}$$

-continued $$g_B = (1-d_1) \cdot 1 - \left(\frac{\sin(\pi d_1)}{\pi}\right) \cdot \cos(2\pi \cdot (\theta(t) + \varphi)) \quad \text{EQ2B}$$

where each term is the superposition of a weighted DC term (1) and a weighted harmonic basis ($\cos(2\pi(\theta(t)\pm\ )))$. The DC weights are given by pulse width modulation of a duty cycle signal, and complementary pulse width modulation of a duty cycle signal respectively. The harmonic weights for the PWM and CPWM processes have similar magnitudes and are out of phase. The harmonic weights are related to the Fourier series for a rectangular function with prescribed duty cycle, and the harmonic basis is given for normalized phase over the switching period as a function of time, $\theta(t)$, and normalized differential phase offset, $\varphi$. For a half bridge arrangement (which might use $g_A$ or $g_B$ separately) the harmonic amplitude is linked directly to the duty cycle input, and for a full bridge arrangement the harmonic amplitude across a transformer coil is based on the difference in gate signals. The harmonic amplitude may be controlled independently from duty cycle for differential modulation processes as:

$$\varphi = \left(\frac{1}{2}\right) \cdot \left(B_1 - \frac{1}{2}\right) \quad \text{EQ3A}$$

$$g_{AB} = (2d_1 - 1) \cdot 1 + \left(\left(\frac{2}{\pi}\right)\sin(\pi d_1)\sin(\pi B_1)\right) \cdot \cos(2\pi \cdot \theta(t)) \quad \text{EQ3B}$$

where the differential gate signal, $g_{AB}$, is the difference between gate signals $g_A$ and $g_B$, and the differential phase offset, $\varphi$, is a function of the harmonic command, $B_1$. The differential gate signal has a DC sensitivity given by the duty cycle, $(2d_1-1)$, and an AC sensitivity given by duty cycle and harmonic commands, $$\left(\left(\frac{2}{\pi}\right)\sin(\pi d_1)\sin(\pi B_1)\right).$$

The sensitivity due to the harmonic command, $\sin(\pi B_1)$, is due to differential phase cancellation of $g_A$ and $g_B$ for the embodiment. EQ3A is used to represent harmonic command sensitivity similar to duty cycle sensitivity, using a linear transform where the harmonic command ranges between zero and one with a mid-point of one half. The range of a DHC circuit may be scaled using resistors relative to an arbitrary set point. The harmonic command, $B_1$, allows for the sensitivity of the harmonic term to be independently adjusted after taking into account the duty cycle sensitivity which controls the DC term. A similar process may be used to generate gate signals, $g_C$ and $g_D$, and their difference, $g_{CD}$, with additional superimposed modulated phase and and non-modulated duty cycle commands imposed by a feedback compensator.

The following equation demonstrates an alternate embodiment where the duty cycle command, $d_1$, approaches one half (resulting in the related sensitivity term approaching one):

$$(g_{AB})_{d_1=0} = \left(\left(\frac{2}{\pi}\right)\sin(\pi B_1)\right) \cdot \cos(2\pi \cdot \theta(t)) \quad \text{EQ4}$$

which simplifies EQ4 to have AC sensitivity controlled by the harmonic command input. For the alternate embodiment where the duty cycle approaches one half, a center voltage potential may be inductively coupled to either of the associated nodes (VA or VB). The described embodiment results in a bipolar regulated power supply with positive and negative voltages relative to the center potential with few added parts. A different unipolar configuration may be developed where a common mode gate duty cycle is used to adjust the harmonic with antiphase modulation. A common duty cycle is representative of the DHC block with switches omitted, which results in a positive and negative duty cycle command superimposed on the common triangle waveform, and the negative duty cycle is complemented to result in a common gate DC potential with antiphase harmonic content. The alternate duty cycle method for commanding harmonic output is less preferable than the phase command method because the sensitivity might not be monotonic at some operating points. Additional variations, such as non-complemented PWM processes, are possible which result in equivalent gate signal control behavior.

Dynamic behavior of an embodiment of a synchronous generalized regulator is described mathematically using the superimposed feedback of the synchronous average harmonic current compensator. The SAHC compensator is implemented in one or more embodiments with a switched capacitor filter driven by a measure of bridge current. The switched capacitor filter has a linear time varying characteristic which results in one signal path being able to represent two independent degrees of freedom in a modulated and non-modulated reference frame. The measured current (across bridge switching nodes VC and VD) is given by:

$$\vec{I}_{CD,f} = \vec{Y}_{R,f} \odot (\vec{g}_{AB,f} * \vec{V}_{1,f}) + \vec{Y}_{Lm\|R,f} \odot (\vec{g}_{CD,f} * \vec{V}_{2,f}) \quad \text{EQ5}$$

where $\vec{I}_{CD,f}$ is a conjugate symmetric current frequency response vector, $\vec{Y}_{R,f}$ is an admittance (or current response due to voltage input) vector (for example representing FIG. 2 network 205), and $\vec{Y}_{Lm\|R,f}$ is an admittance vector due to the parallel combination of the network represented by $\vec{Y}_{R,f}$ and a magnetizing inductance. The magnetizing inductance may represent an equivalent magnetizing inductance of a transformer or an inductance in series with a line current, or both. The input voltage used to calculate current is calculated as $(\vec{g}_{AB,f} * \vec{V}_{1,f})$ and $(\vec{g}_{CD,f} * \vec{V}_{2,f})$ respectively which represent modulation of each respective gate signal and bus voltage using a convolution operator in the frequency domain. The Hadamard multiply operator, '$\odot$' represents an element-wise multiply. The bridge current frequency vector represents response in the frequency domain including line currents and switching transformer currents. The SAHC compensator non-modulated path feeds back on a measure of $\vec{I}_{CD,f}$ directly to control on line currents, and the modulated path feeds back on reactive (square wave synchronous) current to linearize coupling admittance between isolated bridges.

The synchronous average harmonic current compensator non-modulated feedback controls low frequency bridge (and line) current response. The non-modulated current loop gain is calculated by finding the sensitivity of bridge current with respect to changes in duty cycle command to the current controlled bridge (which alters $\vec{g}_{CD,f}$). The current response due to voltage is given by admittance, $\vec{Y}_{Lm\|R,f}$, which represents parallel high frequency current through the transformer and low frequency current through a magnetizing inductance. The non-modulated loop gain is:

$$LG_0[f] = k[f] \cdot Y_{Lm}[f] \cdot 2 \cdot V_{2,f=DC} \quad \text{EQ6}$$

where $LG_0[f]$ represents the non-modulated SAHC loop gain at a given frequency index, $k[f]$ represents compensator response, $Y_{Lm}[f]$ represents current response through equivalent magnetizing inductance (associated with the transformer or line connection or both), and $2 \cdot V_{2,f=DC}$ represents pulse width modulation gain for a differential modulation process. The bridge is considered to be current controlled over the bandwidth where loop gain is greater than one. The compensator response is described by the switched capacitor filter (for example FIG. 2, 210, SAHC) where an integration frequency is defined using nominal switched capacitance value (C1, C2) and double the nominal input resistor value (R11, R12). Additional lead lag dynamics may be implemented by included a resistor capacitor network in parallel with each switched capacitance. For the embodiment shown in FIG. 2, the compensator dynamics, $k[f]$, are similar for the non-modulated and modulated feedback loops.

The superimposed modulated feedback path of the synchronous average harmonic current compensator linearizes harmonic coupling between bridge bus voltages. Current into each respective voltage bus is calculated by modulating current across bridge switching nodes by bridge gate signals. A compact notation is described to calculate output bus current which is modulated relative to bridge current in response to modulated input bus voltage:

$$I_1[f] = Y_{\langle AB,AB \rangle}[f] \cdot V_1[f] - Y_{\langle AB,CD \rangle}[f] \cdot V_2[f] \quad \text{EQ7A}$$

$$I_2[f] = -Y_{\langle CD,AB \rangle}[f] \cdot V_1[f] + Y_{\langle CD,CD \rangle}[f] \cdot V_2[f] \quad \text{EQ7B}$$

where $I_1[f]$ and $I_2[f]$ represent bus current responses at a given frequency index, and $V_1[f]$ and $V_2[f]$ represent dynamic voltage perturbations at the given frequency. The expressions, ($Y_{\langle AB,AB \rangle}[f]$ and $Y_{\langle AB,CD \rangle}[f]$) and ($Y_{\langle CD,AB \rangle}[f]$ and $Y_{\langle CD,CD \rangle}[f]$), represent respective linearized admittance from voltage bus inputs to current flow through each bus. The calculation for each linearized admittance term is illustrated by way of example for a representative cross-admittance term:

$$\vec{Y}_{\langle CD,AB \rangle} = (g_{CD,k1} \cdot \bar{g}_{AB,k1}) \cdot \vec{Y}_{R,f-f_c} + (\bar{g}_{CD,k1} \cdot g_{AB,k1}) \vec{Y}_{R,f+f_c} \quad \text{EQ8A}$$

$$y_{\langle CD,AB \rangle}[f] = (g_{CD,k1} \cdot \bar{g}_{AB,k1}) \cdot \bar{Y}_R[f_c - f] + (\bar{g}_{CD,k1} \cdot g_{AB,k1}) Y_R[f_c + f] \quad \text{EQ8B}$$

where $\vec{Y}_{\langle CD,AB \rangle}$ represents second bus current due to first bus voltage at each output frequency, and $Y_{\langle CD,AB \rangle}[f]$ is a current response due to voltage at a selected frequency. EQ8A and EQ8B represent a sum of terms modulated by the first harmonic of response gate signal, $g_{CD,k1}$, and the first harmonic of the input perturbation gate signal, $g_{AB,k1}$. Conjugate pairs of signals (wherein one signal has an overbar) represent first harmonic frequency modulation combinations that project to the same linearized output frequency response, weighting frequency shifted admittance vectors $\vec{Y}_{R,f-f_c}$ and $\vec{Y}_{R,f+f_c}$ respectively. Conjugate symmetry is used to calculate EQ8B using only positive frequencies, where EQ8B can be interpreted as the weighted sum of responses at conjugate mirrored frequencies, $+/-f$, about the switching frequency, $f_c$.

The system response is linearized by controlling the current controlled bridge gate signal to minimize synchronous average harmonic current using modulated feedback. The open loop response given in EQ7A and EQ7B (without feedback) is highly variable because it may behave like a current source or a voltage source depending on interaction of the switching frequency and admittance network. The open loop characteristic is undesirable for power converters with reactive admittance network components which may have tolerances. The closed loop response superimposes a linearizing system admittance, which attenuates reactive current synchronous with each half of a square wave switching period as:

$$I_{1:V1}[f] = Y_{\langle AB,AB \rangle}[f] - \frac{Y_{\langle AB,SQ \rangle}[f] \cdot Y_{\langle SQ,AB \rangle}[f]}{Y_{\langle SQ,SQ \rangle}[f]} \quad \text{EQ9A}$$

$$I_{1:V2}[f] = Y_{\langle AB,CD \rangle}[f] - \frac{Y_{\langle AB,SQ \rangle}[f] \cdot Y_{\langle SQ,CD \rangle}[f]}{Y_{\langle SQ,SQ \rangle}[f]} \quad \text{EQ9B}$$

$$I_{2:V1}[f] = Y_{\langle CD,AB \rangle}[f] - \frac{Y_{\langle CD,SQ \rangle}[f] \cdot Y_{\langle SQ,AB \rangle}[f]}{Y_{\langle SQ,SQ \rangle}[f]} \quad \text{EQ9C}$$

$$I_{2:V2}[f] = Y_{\langle CD,CD \rangle}[f] - \frac{Y_{\langle CD,SQ \rangle}[f] Y_{\langle SQ,CD \rangle}[f]}{Y_{\langle SQ,SQ \rangle}[f]} \quad \text{EQ9D}$$

where $I_{1:V1}[f]$ and $I_{1:V2}[f]$ represent first bus current responses due to respective first and second bus voltage perturbations, and $I_{2:V1}[f]$ and $I_{2:V2}[f]$ represent second bus current responses due to respective first and second voltage bus perturbations. Each response given in EQ9A, EQ9B, EQ9C, EQ9D, is the superposition of an open loop linearized admittance response and an electronically modified admittance due to feedback control. The equations approximate dynamic coupling behavior of a synchronous generalized regulator system over conditions where the superimposed modulated feedback loop gain is greater than one:

$$Y_{\langle SQ,SQ \rangle}[f] = \left(\frac{4}{\pi^2}\right) \cdot (\bar{Y}_{Lm\|R}[f_c - f] + y_{Lm\|R}[f + f_c]) \quad \text{EQ10A}$$

$$g = \sin(\pi \cdot d_2) \cdot \left(\frac{\pi}{2}\right) \cdot V_{2,f=DC} \quad \text{EQ10B}$$

$$LG_1[f] = g \cdot k[f] \cdot Y_{\langle SQ,SQ \rangle}[f] \quad \text{EQ10C}$$

wherein the modulated feedback loop gain $LG_1[f]$ is the product of a linearization constant, g, compensator gain, $k[f]$, and a linearized admittance, $Y_{\langle SQ,SQ \rangle}[f]$. The loop gain is the gain from a phase command input to a compensated modulated bridge current. The linearized admittance, $Y_{\langle SQ,SQ \rangle}[f]$, represents modulated current response due to modulated phase command input, where $g_{SQ}$ is a synchronous square wave which is approximately orthogonal to $g_{AB}$ and $g_{CD}$. EQ10A is calculated using a similar methodology to EQ8B, with terms substituted to reflect the synchronous square wave input and output modulation. The linearization constant, g, reflects the amplitude sensitivity of a harmonically filtered pulse width modulation process. Embodiments wherein the loop gain is less than one may be used to control on power converters with high impedance between busses, and embodiments wherein the loop gain is greater than one approximate the low impedance coupling dynamics illustrated in FIG. 5.

Closed loop responses of synchronous generalized regulator systems are described (for modulated loop gains greater than one) by combining the system equations given by EQ9A, EQ9B, EQ9C, EQ9D, the linearized modulation described in EQ8B, and the harmonic expansion given in EQ3. The linearized cross admittance terms, $Y_{<SQ,AB>}[f]$ and $Y_{<SQ,CD>}[f]$, $Y_{<AB,SQ>}[f]$ and $Y_{<CD,SQ>}[f]$, represent pairs of frequency responses which are conjugate mirrored about the switching frequency as illustrated in EQ8B. The cross-admittance terms represent a symmetry error which is minimal when the frequency response is conjugate symmetric about the switching frequency, as is the case when the switching frequency aligns with a natural frequency of a resonant admittance network. For loop gains greater than one, the effect of control is to superimpose an admittance term which actively adjusts the total electronic admittance to have a natural frequency which aligns with the switching frequency. At this operating point, the sum total of the active and passive admittance is conjugate symmetric about the switching frequency, resulting in the linearized admittance appearing inductive (similar to the admittance of a resonant network sampled above the resonant frequency). The equivalent harmonically linearized admittance network (as illustrated using LEQ, FIG. 5) is:

$$Y_{LEQ} = \left(\frac{\pi^2}{8}R_0 + j2\pi f \cdot \frac{\pi^2}{4}L_R\right)^{-1} \quad \text{EQ11A}$$

$$I_{LEQ}[f] = \quad \text{EQ11B}$$
$$-Y_{LEQ} \cdot (\sin(d_1\pi)\sin(B_1\pi) \cdot V_1[f] - \sin(d_2\pi)\sin(B_2\pi) \cdot V_2[f])$$

where $Y_{LEQ}$ is the linearized harmonic admittance, $R_0$ is the switch and passive component resistance, and $L_R$ is the inductance associated with the admittance network. The current flowing through the effective linearized harmonic admittance is given by $I_{LEQ}[f]$, which is calculated by taking the difference between harmonically weighted input voltages and projecting through the linearized harmonic admittance. The harmonically transmitted current is linearized by attenuating reactive current using the synchronous average harmonic current control process which reduces current synchronous with the square wave switching period. The harmonically transmitted current is not measured directly in the linearized reference frame, but it can be estimated by modulating bridge current by a quadrature square wave which is 90 degrees delayed relative to the synchronous square wave used by the SAHC compensator. The current calculated in EQ11B is relevant for safe operating area current limiting processes, such as hysteretic or cycle by cycle current limiting. The current flowing through each bus is calculated by using harmonic weights which represent output current due to input voltage perturbation as a function of equivalent linearized harmonic current:

$$I_1[f] = -\sin(d_1\pi)\sin(B_1\pi) \cdot I_{LEQ}[f] \quad \text{EQ12A}$$

$$I_2[f] = +\sin(d_2\pi)\sin(B_2\pi) \cdot I_{LEQ}[f] \quad \text{EQ12B}$$

where respective bus currents, $I_1[f]$ and $I_2[f]$, are weighted functions of the harmonically transferred current, $I_{LEQ}[f]$.

The behavior of a synchronous generalized regulator may be approximated using EQ12A and EQ12B for an equilibrium current flow as:

$$\frac{V_2}{V_1} = \frac{\sin(\pi \cdot d_1)\sin(\pi \cdot B_1)}{\sin(\pi \cdot d_2)\sin(\pi \cdot B_2)} \quad \text{EQ13}$$

where the steady state ratio between bus voltages is proportional by the sines of respective duty cycles and harmonic commands. The relationship shown in EQ13 is provided for a transformer with unity turns ratio, and the equation and dynamics may be scaled for arbitrary turns ratios with power preserved. The terms $B_1$ and $B_2$ represent harmonic buck and boost commands, which may be used to regulate relative bus voltage using feedforward processes, or using feedback with a voltage error amplifier relative to a reference.

A harmonic current controlled detailed dynamic embodiment of a synchronous generalized regulator is illustrated in FIG. 6, wherein the SGR(DETAIL) block of FIG. 5 is augmented with quadrature current control to form the SGR(IQC) block of FIG. 6. The dynamic embodiment of FIG. 6 is descriptively similar to the embodiment illustrated in FIG. 5, with harmonic commands (B1 and B2) controlled by an added quadrature current control block (IQC). The quadrature current control block adjusts the harmonic commands using a precision diode stage (PD) to generate buck and boost harmonic signals which reduce tracking error between estimated harmonic current (ILEQ) and commanded current (IQCMD). Precision diodes may be implemented using active opamp circuits according to the state of the art, or with alternate complementary signal splitting circuits (such as known to the art of solid state power amplification). The estimated harmonic current illustrated in FIG. 6 is a linearized measure which may be calculated by multiplying a measure of bridge current (for example VICD of FIG. 2) by a quadrature square wave (QSQ) which is synchronous with harmonically transmitted current. The synchronous average harmonic current compensator attenuates reactive current (synchronous with a square wave) from the current sensor signal which results in the harmonic current signal being comprised primarily of the transmitted current (synchronous with the quadrature square wave). The transmitted harmonic current command (IQCMD) may be used to control isolated harmonic power sharing between one or more synchronous generalized regulators. The analog level command (IQCMD) may be driven to regulate one or more bus voltages, and the bandwidth requirements of the command signal are minimal which allow for simple analog control or low bandwidth commodity digital control of multiple modules.

FIG. 7 illustrates an embodiment of a synchronous generalized regulator which is commanded to regulate output using stored power in the event of a low line voltage. The interfacing terminals of the FIG. 7 SGR block are descriptively similar to those illustrated in the FIG. 4 SGR block respectively, with a commanded input set to address the low line voltage condition. Under a low line voltage condition (given by VAC2 equal to zero), which may be detected according to the state of the art of audio power amplification, the commanded current (ICMD) is set to zero to reflect the absence of line power. Feedforward regulation (700) is achieved in this configuration by driving a reference voltage (VREF), which may be a sine wave or other output waveform according to the state of the art, to the line voltage command (VCMD) and a harmonic command (B2) configured as a bucking input. The DC buses, V1 and V2, are approximately equal under this condition. The resulting configuration regulates line output relative to an internal energy source (stored energy represented by capacitors CS1 and CS2) without requiring additional power components. The regulation relationship illustrated in FIG. 7 is given by:

$$\frac{V_2}{V_1} = \frac{\sin(\pi \cdot d_1)}{\sin(\pi \cdot B_2)} \qquad \text{EQ14}$$

where the voltage command (VCMD) controlling $d_1$ is set equal to the harmonic bucking command, $B_2$, to cause V2 to track V1 using a feedforward harmonic relationship. Control is simplified under this condition where the current controlled line connection is at zero volts by setting other regulation degrees of freedom constant ($d_2$=0.5 and $B_1$=0.5). The output line voltage (VAC1) tracks the voltage command (VCMD) in proportion to the tracking bus voltage.

An alternate feedback embodiment, in contrast to the feedforward embodiment illustrated in FIG. 7, can be used to automatically regulate converter output without requiring detection of a loss of line voltage condition. The harmonic voltage controlled synchronous generalized regulator of FIG. 5, or the harmonic current controlled synchronous generalized regulator of FIG. 6 may be further incorporated into power systems which command harmonic power flow to regulate an isolated bus voltage using a voltage feedback error amplifier. For embodiments where the bus voltage is regulated, the respective current and voltage line commands (ICMD and VCMD) may be used directly to control respective isolated line connections. Further embodiments may use current shaping of a line current command, or harmonic current transfer command to perform power factor correction.

A soft start embodiment of a single stage synchronous generalized regulator is illustrated in FIG. 8. According to the embodiment in FIG. 8, the current controlled bridge has multiple bus voltage connections which are split between V2S and a voltage bus V2 associated with stored energy. Current may be transferred between split voltage busses by using a current command (ICMD). For this configuration, the current controlled bridge line voltage is closed and the voltage controlled bridge line voltage has an open connection so the power converter acts as a DC/DC converter with commanded softstart current to an energy storage element (CS2). The embodiments illustrated in FIG. 8 and FIG. 2 are different because FIG. 8 splits the voltage bus connection (at the current controlled bridge 602) between bus connection nodes of switches SC and SD. The split bus connection allows for commanded current flow between bus V2S and V2 through inductor L5 and isolated power transfer through the transformer coil LT2. The embodiment may be further simplified by setting L5 to be given by the magnetizing inductance associated with the coil LT2 resulting in the same magnetic element serving both functions. The illustrated embodiment also shows that the synchronous generalized regulator may be configured as a DC/DC converter by closing the current controlled line and opening the voltage controlled line. Given that the current is regulated by current command, the harmonic commands (B2 and B1) are available to buck and boost output to the isolated bus voltage V1. The remaining blocks (801, 803, 804, 805, 806, 807, 808, 809, 810, 811, 812) are descriptively similar to those shown in FIG. 2 (201, 203, 204, 205, 206, 207, 208, 209, 210, 211, 212) respectively, apart from individual application configurations such as the change in line connection. The embodiment illustrated in FIG. 8 has a harmonic bus voltage regulation relationship:

$$\frac{V_2}{V_1} = \frac{\sin(\pi \cdot d_1)\sin(\pi \cdot B_1)}{\sin(\pi \cdot B_2)} \qquad \text{EQ15}$$

where relative duty cycle across the current controlled bridge is controlled by the SAHC controller, and the remaining harmonic (B1 and B2) and duty cycle (d1) command degrees of freedom are free for voltage regulation. The embodiments shown in FIG. 7 and FIG. 8 are meant to illustrate possible configurations, and further adaptations are possible which take advantage of the multiple regulated connections offered by the synchronous generalized regulator.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:
1. A power converter comprising:
a voltage controlled bridge comprising a first plurality of switches, wherein one or more first switching nodes of the voltage controlled bridge is coupled to: a first transformer winding of a transformer device, and a line voltage;
a current controlled bridge comprising a second plurality of switches, wherein one or more second switching nodes of the current controlled bridge is coupled to: a second transformer winding of the transformer device, and a line current;
at least one first voltage controller circuit configured to control the line voltage relative to a commanded voltage and vary a primary harmonic voltage relative to a primary harmonic command using the first plurality of switches;
at least one second current controller circuit configured to control a bridge current and vary a secondary harmonic voltage relative to a secondary harmonic command using the second plurality of switches;
an admittance network comprising an inductive admittance or a capacitive admittance or a resonant inductive admittance and capacitive admittance, wherein the admittance network is coupled with the first transformer winding, or the second transformer winding, or the first transformer winding and the second transformer winding; and
a synchronous average harmonic current compensator comprising a feedback circuit which reduces a current error signal synchronously averaged over each half of a switching period by altering a modulation waveform of at least one of the first controller circuit or the second controller circuit linearizing a coupling admittance between the primary harmonic voltage and the secondary harmonic voltage, the current error signal comprising an error between a commanded current and a measure of current across bridge switching nodes,
wherein the synchronous average harmonic current compensator further comprises a switched capacitor filter configured to integrate and compensate the current error signal synchronously over each half of a square wave switching period and sample a switched capacitor output to generate a superimposed modulated and non-modulated feedback signal.

2. The power converter of claim 1, wherein the first voltage controller circuit or the second current controller circuit or the first voltage controller circuit and second current controller circuit is further comprising a harmonic command circuit configured to command a pulse width modulation process to modify a harmonic coupling relative to a harmonic command.

3. The power converter of claim 1, wherein the commanded voltage and the primary harmonic command are dependent, or the commanded voltage and the primary harmonic command are independent.

4. The power converter of claim 1, wherein a current feedback signal and the secondary harmonic command are dependent, or the current feedback signal and the secondary harmonic command are independent.

5. The power converter of claim 1, wherein one or more of: the voltage command, the current command, the primary harmonic command, and the secondary harmonic command are generated according to a feedforward regulation circuit.

6. The power converter of claim 1, wherein the primary harmonic voltage or the secondary harmonic voltage or the primary harmonic voltage and the secondary harmonic voltage are varied using a feedback mechanism, wherein the feedback mechanism reduces error between an estimated harmonically transferred current and commanded harmonic current or reduces an error between a measured voltage and a reference voltage.

7. The power converter of claim 1, wherein the line voltage is coupled to an open circuit and the voltage command is set to a regulation input.

8. The power converter of claim 1, wherein the line current is coupled to a closed circuit and the current command is set to a regulation input, or the line current is free to be controlled by an independent element and the current command is set to a regulation input.

9. The power converter of claim 1, wherein the first transformer winding, or the second transformer winding, or both the first transformer winding and second transformer winding further comprise one or more line filter elements.

10. The power converter of claim 1, wherein the transformer device has a distributed inductance which participates in the admittance network, or one or more line filters, or the admittance network and the one or more line filters.

11. The power converter of claim 1, wherein the measure of current across bridge switching nodes includes a transformer device current and the line current, or includes a transformer device current wherein line current is controlled by an independent circuit or component.

12. The power converter of claim 1, wherein the first plurality of switches, or the second plurality of switches, or the first plurality of switches and the second plurality of switches is coupled to one or more energy storage elements.

13. The power converter of claim 1, wherein one or more of the: voltage command, current command, primary harmonic command, and secondary harmonic command are generated by an analog controller as part of a power system.

14. The power converter of claim 1, wherein one or more of the: voltage command, current command, primary harmonic command, and secondary harmonic command are generated by a digital controller as a part of a power system.

15. The power converter of claim 1, wherein the current controlled bridge is coupled to a split bridge circuit further comprising a split plurality of switches coupled to a split voltage bus.

16. A method comprising:
controlling, using a voltage controlled pulse width modulation process, a line voltage of a voltage controlled bridge and a primary harmonic coupling voltage of the voltage controlled bridge;
harmonically coupling, using a synchronous average harmonic current compensator, a current controlled bridge to the voltage controlled bridge by sensing, compensating and sampling a synchronous average current over each half of a square wave switching period, wherein the synchronous average harmonic current compensator further integrates and compensates a current error signal synchronously over each half of the square wave switching period to generate a superimposed modulated and non-modulated feedback signal to a current controlled bridge pulse width modulation process;
controlling, using the current controlled bridge pulse width modulation process, a bridge current of the current controlled bridge and a secondary harmonic coupling voltage of the current controlled bridge; and
independently commanding a harmonic gain, using a harmonic command, wherein the harmonic command comprises a primary harmonic command to vary the primary harmonic coupling voltage, or a secondary harmonic command to vary the secondary harmonic coupling voltage, or the primary harmonic command to vary the primary harmonic coupling voltage and the secondary harmonic command to vary the secondary harmonic coupling voltage.

17. The method of claim 16, further comprising:
transferring current between a split voltage bus and an energy storage element using the current controlled bridge.

18. A power converter comprising:
a voltage controlled bridge comprising a first plurality of switches, wherein one or more first switching nodes of the voltage controlled bridge is coupled to: a first transformer winding of a transformer device, and a line voltage;
a current controlled bridge comprising a second plurality of switches, wherein one or more second switching nodes of the current controlled bridge is coupled to: a second transformer winding of the transformer device, and a line current;
at least one first voltage controller circuit configured to control the line voltage relative to a commanded voltage and vary a primary harmonic voltage relative to a primary harmonic command using the first plurality of switches;
at least one second current controller circuit configured to control a bridge current and vary a secondary harmonic voltage relative to a secondary harmonic command using the second plurality of switches;
an admittance network comprising an inductive admittance or a capacitive admittance or a resonant inductive admittance and capacitive admittance, wherein the admittance network is coupled with the first transformer winding, or the second transformer winding, or the first transformer winding and the second transformer winding; and
a synchronous average harmonic current compensator comprising a feedback circuit which reduces a current error signal synchronously averaged over each half of a switching period by altering a modulation waveform of at least one of the first controller circuit or the second controller circuit linearizing a coupling admittance between the primary harmonic voltage and the secondary harmonic voltage, the current error signal comprising an error between a commanded current and a measure of current across bridge switching nodes, wherein the synchronous average harmonic current compensator further comprises an analog multiplying phase locked loop, wherein the analog multiplying phase locked loop further comprises an analog multiplying phase detector which modulates the current error signal by a multiplication process synchronously over each half switching period to drive an integrating error amplifier, and wherein the integrating error amplifier controls a voltage controlled oscillator to feedback on the modulation waveform.

* * * * *